United States Patent Office 3,669,675
Patented June 13, 1972

---

3,669,675
FLOWABLE STABILIZER SUSPENSIONS
Aubrey P. Stewart, Jr., and John D. Falk, Corning, Iowa, assignors to Allied Chemical Corporation, New York, N.Y.
No Drawing. Filed July 15, 1969, Ser. No. 841,996
Int. Cl. A23l 1/04
U.S. Cl. 99—1
8 Claims

ABSTRACT OF THE DISCLOSURE

Liquid stabilizer suspensions are prepared by pelletizing a stabilizer powder, coating said pellet with a soluble food material and suspending the coated pellet in a saturated aqueous solution of the same coating material or other food material which inhibits dissolution.

BACKGROUND OF THE INVENTION

This invention relates to the preparation of high viscosity suspensions containing pelletized stabilizers therein, which promote thickening when hydrated with water. This invention further relates to the preparation of stabilizer suspensions in liquids wherein substantial quantities of stabilizer are introduced without substantial reduction in fluid flow.

The use of high viscosity formatives which function as protective colloids and provide stable emulsions is well known in the art of food formulation. Stabilizers are used, for example, in the preparation of ice cream mix to enhance palatability in the frozen product, promote a desirable texture, reduce ice crystal formation during freezing and to control aeration. Stabilizers are further used as thickening agents, for example, in soups, gravies, fruit juices, puddings, sauces and sour cream. Examples of well-known stabilizers include guar gum, carrageenan, sodium alginate, sodium carboxymethylcellulose, gum acacia, starches, starch derivatives, and pectins.

A substantial problem in the use of these stabilizers is the cohesive tendency they exhibit upon contact with water. This tendency to agglomerate makes it difficult, if not impossible, to achieve uniform distribution of the stabilizing agent throughout an aqueous base food mix to which it is added. Although this tendency is magnified when the stabilizer is ground to a fine particulate form, such form is frequently desirable to expose a large surface area, in relation to weight, and thus permit rapid hydration.

The tendency of these stabilizers to undergo rapid hydration forming extremely viscous dispersions makes predisperse aqueous mixes to which they are added very difficult to handle, since they do not readily flow and, therefore, are not easily added to mixing vats. Stabilizers added dry to a mixing vat containing an aqueous food base tend to agglomerate, lump, and clog pipes.

One solution to the above problems is to predisperse the stabilizer in water-free propylene glycol, or equivalent organic solvents, prior to introducing the stabilizer into an aqueous comestible base. Stabilizers added in this manner flow readily into the mixture to which they are added and become uniformly distributed therein. However, the use of propylene glycol or the like as a liquid carrier is objectionable in that a substance foreign to the food formulation is introduced therein. A further objection to predispersing the stabilizer in propylene glycol is the high sterilizing temperature and long sterilizing time period to which the propylene glycol carrier must be subjected to insure sterility in the water-free suspension and thus damage to the stabilizer results.

According to the instant invention, an aqueous stabilizer suspension is prepared containing high stabilizer concentrations without causing excessively high viscosities. In addition, these stabilizer suspensions are introduced into food formulations without causing lumping and without introducing substances foreign to the food formulation into which they are incorporated. Other advantages of the instant invention as compared with prior art will become more apparent upon examination of the following more detailed disclosure.

SUMMARY OF THE INVENTION

We have discovered that a powdered stabilizer, such as sodium carboxymethylcellulose, can be pelletized and coated with a water soluble food material, such as sucrose, and that said pellets resist excessive hydration when suspended in saturated aqueous solutions of the same coating material. Aqueous stabilizer suspensions thus prepared do not gel or become excessively viscous at ambient temperatures. Such a stabilizer suspension is readily sterilzed because of the presence of water, and at much lower temperature or holding time than required for water-free suspensions.

Coated pellets can be suspended in aqueous solutions of food materials that differ from the coating substrate. The dispersing agent may be prepared from any component commonly incorporated during preparation of comestibles which substantially inhibits dissolution of the substrate coating, thereby maintaining the protective action of the coating on the stabilizer particles. For instance, carboxymethylcellulose may be pelletized by conventional means, coated with sucrose and suspended in a corn syrup solution.

DESCRIPTION OF THE PREFERRED EMBODIMENTS

Aqueous stabilizer suspensions prepared according to the instant invention may be sterilized by subjecting them to temperatures of about 280° F. to 290° F. for about 5 to 10 seconds. In contrast, unpelletized stabilizers suspended in a water-free propylene glycol carrier, or equivalent organic solvent, require temperatures in excess of 300° F. for 5 to 10 minutes to insure sterility. The maintenance of high temperatures over long periods of time, concomitant with the use of propylene glycol, reduces the characteristic flavor of food products such as puddings, pie fillings and sour cream and substantially inhibits stabilizer thickening action.

In accordance with this invention, food products are prepared which have heretofore been impossible to produce satisfactorily. For example, a sucrose coated stabilizer pellet suspended in a saturated or supersaturated sucrose syrup solution may be flavored with orange oil and a food acidulant, such as malic acid, to yield a highly concentrated orange flavored beverage base. A beverage base prepared in this manner flows readily upon pouring and contains only components usual to the preparation of such products. Admixing these concentrated bases with water to form an aqueous blend permits dissolution of the sucrose coating substrate and releases the stabilizer for rapid hydration. The resulting orange flavored beverage has the proper viscosity for pleasant "mouth feel." The instant stabilizer suspension also acts to promote and maintain the resulting beverage base oil-in-water emulsion and serves as a clouding agent for enhanced eye appeal.

Beverage bases prepared by using the stabilizers of this invention exhibit excellent physical characteristics on reconstitution and do not cause gelation and excessive viscosity in the concentrate. When a beverage base concentrate exists in a highly viscous form or as a gel, it becomes very difficult to reconstitute with water into a normal strength beverage.

We have also found in the production of low calorie sugar-free beverages that stabilizer pellets coated with malic acid or citric acid can be suspended in an aqueous solution saturated with a suitable food acidulant. Such bases when blended with fruit flavors and artificial sweeteners reconstitute readily with water to form the beverage.

Other uses for high stabilizer concentration flowable liquids include the manufacture of flavored concentrated syrups for the bottling industry, generically named "throw-syrups," ice cream variegating sauce concentrates, and pudding bases.

Although our optimum results are obtained by suspending stabilizer pellets into a saturated or supersaturated solution of material which inhibits dissolution of the stabilizer coating material, our experiments demonstrate practicable inhibition at less than saturation levels.

The following examples serve to illustrate our invention in greater detail.

Example I

Sodium carboxymethylcellulose, mesh size 200 mesh was pelletized and coated with sucrose, wherein the ratio of stabilizer to sucrose was 43% to 50%. The method of pelletizing is described in U.S. Patent 3,248,226. The pellets, as prepared, contained 7% of moisture from the 92% crystallizing sucrose syrup solution applied in the pelletizing process. The pellets, of 30-40 mesh size, were then suspended in a 66.5% sucrose solution, resulting in a final suspension containing 15% stabilizer. The resulting suspension of stabilizer was characteristically fluid, easily pumped and substantially free of lumps although only mild agitation was induced in preparing the suspension. The pelletized stabilizer suspension in sucrose solution remained fluid for the experimental time period, which period was approximately 2½ hours and the solution remained characteristically fluid even though the temperature was increased to 130° F.

Example II

The sucrose pelletized sodium carboxymethylcellulose, heretofor described in Example I, was suspended in 82% corn syrup (42 D.E.), wherein the suspending medium prevented dissolution of the sucrose and a fluid, easily pumped suspension resulted. The concentration of stabilizer in the syrup was 25%.

Example III

A suspension of 4% non-pelletized stabilizer in 66.5% sucrose solution was prepared, yielding a solution of such high viscosity that it was completely gelled and impossible to pump. Hydration to the gel stage occurred in approximately 30 seconds at 80° F. Fluidity of the solution containing the non-pelletized stabilizer was achieved only when the concentration of stabilizer in water was reduced below 2%.

Example IV

Guar gum powder, mesh size 160, was placed in combination with malic acid and pelletized. The pelletized compound, of mesh size 30-40 contained 50% malic acid, 43% guar gum and 7% moisture. When the pellets were suspended in an 80% super-saturated aqueous solution of malic acid, resulting in a concentration of 20% guar gum to 80% malic acid, the reslting suspension was fluid and easily pumped.

A similarly constituted stabilizer which was non-pelletized required a concentration of guar gum below 2.5% to effect equivalent fluidity.

The following chart illustrates the influence exerted on fluidity by increasing the concentration of sucrose in the suspending medium. In all the cases illustrated below 10 gms. of sodium carboxymethylcellulose stabilizer was pelletized, or coated with sucrose and suspended in various concentrations of 100 ml. samples of sucrose syrup. Viscosity was measured at 120° F. with a Brookfield viscometer. In all cases saturation point was considered to be 67% at ambient temperature. Viscosities were measured after 10 minutes waiting period. This chart illustrates that flowability increases with increasing concentrations of the suspending agent.

|  | Percent saturation | Viscosity, centipoise | Flowability |
| --- | --- | --- | --- |
| Percent sucrose: |  |  |  |
| 0 | 0 | $3.25 \times 10^6$ | None. |
| 25 | 37 | $1.85 \times 10^6$ | Do. |
| 50 | 74 | $1.40 \times 10^6$ | Do. |
| 75 | 110 | $.95 \times 10^6$ | Slight. |
| 82 | 120 | $.15 \times 10^6$ | Flowable. |

The following examples are included to illustrate that satisfactory results are obtained when a stabilizer suspension is prepared using an aqueous supending agent that differs from the coating substrate.

Example V (control)

10 gms. of uncoated carboxymethylcellulose and 10 gms. of sucrose were admixed with a 100 ml. sample of a saturated aqueous corn syrup solution. The resulting mixture was a 10% solution of carboxymethylcellulose. The aqueous blend was stirred during admixture and stored for 24 hours. After 24 hours, the sample was heated to 130°-140° F. and the viscosity of the sample was measured as $95 \times 10^6$ cps., using a Brookfield viscometer. The stabilizer did not flow and had a brick-like matrix.

Example VI 10 grams of carboxymethyl cellulose coated with 10 grams sucrol was admixed with 100 ml. of a saturated aqueous corn syrup solution. The resulting mixture was a 10% solution of carboxymethylcellulose. The solution was stirred during admixture and stored for 24 hours. After 24 hours, the sample was heated to 130°-140° F. and the viscosity of the sample was measured as $.125 \times 10^6$ cps., using a Brookfield viscometer. The stabilizer suspension flowed readily and had the consistency of a thick syrup.

Although our invention has been described above in conjunction with the preparation of food products, particularly food products containing high levels of stabilizer, it is not intended that it be thus limited in its applications. Other applications of our invention include any situation where a moisture absorbent barrier is desirable, as in the coating of paper products or in the drilling of oil wells.

While the present invention has been described in detail with respect to specific embodiments thereof, it is not intended that this invention be limited, except by the claims appended hereto.

What is claimed is:

1. An aqueous stabilizer suspension characterized in that it is readily flowable comprising a stabilizer pellet coated with a water soluble substrate selected from the group consisting of edible acids and sugars, said coated pellet being suspended in an aqueous saturated solution selected from the group consisting of edible acids, when said substrate comprises an edible acid, and sugars, when said substrate comprises sugar, said stabilizer suspension being capable of releasing the stabilizer for rapid hydration upon mixing said suspension with additional water.

2. The stabilizer suspension described in claim 1 wherein said coated stabilizer pellet is suspended in an aqueous saturated solution of the same material as that used to coat said stabilizer pellet.

3. The stabilizer suspension described in claim 1 wherein said stabilizer pellet is prepared from a component selected from the group consisting of guar gum, carrageenan, sodium alginate, sodium carboxymethylcellulose, gum acacia, starches, starch derivatives, pectin and combinations thereof.

4. The stabilizer suspension described in claim 2 wherein said aqueous saturated solution and said coating substrate are prepared from sucrose.

5. The stabilizer suspension described in claim 4 wherein said stabilizer pellet consists essentially of carboxymethylcellulose.

6. An aqueous stabilizer suspension characterized in that it is readily flowable comprising a stabilizer pellet coated with a water soluble substrate selected from the group consisting of edible acids and sugars, said coated pellet being suspended in an aqueous supersaturated solution selected from the group consisting of edible acids, when said substrate comprises an edible acid, and sugars, when said substrate comprises sugar, said stabilizer suspension being capable of releasing the stabilizer for rapid hydration upon mixing said suspension with additional water.

7. The stabilizer suspension described in claim 6 wherein said coated stabilizer pellet is suspended in an aqueous supersaturated solution of the same material as that used to coat said stabilizer pellet.

8. The stabilizer suspension described in claim 6 wherein said stabilizer pellet is prepared from a component selected from the group consisting of guar gum, carrageenan, sodium alginate, sodium carboxymethylcellulose, gum acacia, starches, starch derivatives, pectin and combinations thereof.

References Cited
UNITED STATES PATENTS

| | | | |
|---|---|---|---|
| 1,847,356 | 3/1932 | Northcutt | 99—132 |
| 2,000,807 | 5/1935 | Wig | 252—363.5 |
| 2,414,117 | 1/1947 | Musher | 99—131 |
| 2,992,188 | 7/1961 | Miller et al. | 252—363.5 |
| 3,248,226 | 4/1966 | Stewart | 99—26 |

RAYMOND N. JONES, Primary Examiner

J. M. HUNTER, Assistant Examiner

U.S. Cl. X.R.

99—28, 59, 78, 105, 124, 136, 139; 252—363.5